United States Patent Office 3,542,741
Patented Nov. 24, 1970

3,542,741
PRODUCTION OF POLYISOCYANATE-HYDROXY COPOLYMER COATING COMPOSITIONS
Heinrich Hartmann, Limburgerhof, Pfalz, and Hans Wilhelm and Oskar Lissner, Ludwigshafen (Rhine), Germany, assignors to Badische Anilin- & Soda-Fabrik Aktiengesellschaft, Ludwigshafen (Rhine), Germany
No Drawing. Filed Feb. 20, 1968, Ser. No. 706,768
Claims priority, application Germany, Feb. 23, 1967, 1,720,265
Int. Cl. C08f 1/80, 47/12
U.S. Cl. 260—77.5
8 Claims

ABSTRACT OF THE DISCLOSURE

Light-resistant coating materials and their production by reacting polyisocyanates which do not contain any aromatic radicals with copolymers containing hydroxyl groups which have been prepared by solution polymerization in the presence of organic sulfides free from mercapto groups and which contain certain amounts of copolymerized units of alkyl acrylates, alkyl methacrylates, monoesters of acrylic acid or methacrylic acid with polyhydric alcohols, vinyl aromatics or vinyl esters.

---

This invention relates to a process for the production of coating materials based on reaction products of polyisocyanates with copolymers containing hydroxyl groups derived from esters of acrylic acid and/or methacrylic acid and alkanols, monoesters of acrylic acid and/or methacrylic acid and polyhydric alcohols and other copolymerizable olefinically unsaturated monomers, and to the coating materials thus produced.

It is known that coating materials can be prepared from polymers containing hydroxy groups and polyisocyanates. The polymers containing hydroxyl groups used are usually polyesters and particularly saturated branched polyesters which have been prepared by polycondensation of dicarboxylic or polycarboxylic acids with an excess of polyhydric aliphatic alcohols.

Compositions of this type give coatings which are scratch-resistant and resistant to solvents and have good mechanical properties but which become yellow after a time upon weathering and exposure to light.

It is also known that polymers and copolymers containing hydroxyl groups, for example copolymers of ethylene glycol monoacrylate, can be used together with polyisocyanates for the production of coatings. If these copolymers are reacted with the usual aromatic isocyanates, however, compositions are obtained which are not lightfast. If an attempt is made to overcome this disadvantage by replacing the aromatic polyisocyanates by aliphatic polyisocyanates, the polyisocyanates will mix with the solutions of the copolymers but the resultant compositions have drying times which are far too long. Coatings from these materials remain tacky far too long for practical purposes and moreover in pigmented form have a matt appearance.

We have now found that light-resistant coating materials based on reaction products of polyisocyanates and copolymers of esters of acrylic acid and/or methacrylic acid and alkanols, monoesters of acrylic acid and/or methacrylic acid and polyhydric alcohols and other copolymerizable olefinically unsaturated monomers can be advantageously prepared by reacting a polyisocyanate which does not contain any aromatic radicals with a copolymer of:

(1) 15 to 40% by weight of a monoester of acrylic acid and/or methacrylic acid with an aliphatic polyhydric alcohol;

(2) 5 to 70% by weight of an ester of acrylic acid and/or methacrylic acid with an alkanol which forms homopolymers having glass temperatures of from +3° C. to +120° C.;

(3a) 10 to 55% by weight of a vinyl aromatic or isopropenyl aromatic having eight to fourteen carbon atoms, or (3b) 10 to 20% by weight of a vinyl ester of an alkane monocarboxylic acid having two to five carbon atoms;

(4) 0 to 10% by weight of a vinyl ester of an alkane monocarboxylic acid having two to five carbon atoms; and (5) 0 to 20% of one or more other olefinically unsaturated monomers whose polymerized radicals do not react with isocyanates under the reaction conditions, which has been obtained by polymerizing the monomers in an inert organic solvent which is inert to isocyanates in the presence (as a regulator) of an organic sulfide which does not contain any mercapto groups.

The copolymers used according to this invention should consist to the extent of 15 to 40% by weight and particularly 20 to 30% by weight (with reference to all the monomeric components) of monoesters of acrylic acid and/or methacrylic acid with aliphatic polyhydric alcohols, i.e., esters of aliphatic diols or polyols in which only one hydroxyl group is combined with the acrylyl or methacrylyl radical. Particularly suitable compounds of this type are monoesters of alkanediols, such as the monoacrylates or monomethacrylates of ethylene glycol, 1,3-propanediol, 1,2-propanediol, butanediols, pentanediols or hexanediols. Preferred compounds of the said type are ethylene glycol monoacrylate, ethylene glycol monomethacrylate, 1,4-butanediol monoacrylate, 1,4-butanediol monomethacrylate, 1,3-propanediol monoacrylate, 1,3 - propanediol monomethacrylate, 1,2 - propanediol monoacrylate and 1,2 - propanediol monomethacrylate. Acrylates and methacrylates of polyalcohols, such as glycerol, and diols and polyols having hydrocarbon chains which are interrupted by heteroatoms, such as diethylene or triethylene glycol, are also suitable. Obviously the monoacrylates or monomethacrylates may also be used mixed together.

Suitable acrylic esters of methacrylic esters of alkanols which are to form component (2) in amounts of from 5 to 70% by weight and particularly 35 to 65% by weight in the copolymer are the esters which form homopolymers having glass temperatures of from +3° C. to +120° C. (cf. Nielsen, Mechanical Properties of Polymers, New York, 1962, chapter 2). Of these the esters of alkanols having one to four carbon atoms are particularly suitable, methyl methacrylate and tert-butyl acrylate being preferred.

Vinyl aromatics or isopropenyl aromatics having eight to fourteen carbon atoms include particularly the corresponding hydrocarbons, such as styrene, α-methylstyrene, o-vinyltoluene, m-vinyltoluene, p-vinyltoluene or vinylnaphthalene. Styrene is particularly suitable. The proportion of these monomers in the copolymer should be from 10 to 55% by weight and particularly from 15 to 30% by weight.

Instead of vinyl aromatic or isopropenyl aromatic monomers which it is preferred to use, vinyl esters of alkane monocarboxylic acids having two to five carbon atoms, such as vinyl acetate, vinyl propionate or vinyl pivalate, may be used in the production of the copolymers. Since these vinyl esters may be contained in the copolymer as comonomers in amounts of 0 to 10%, particularly 0 to 5%, by weight of the total monomers, independently of the use of the said vinyl aromatic or isopropenyl aromatic monomers, the total amount of polymerized units of vinyl esters may be up to 30% by weight. Of the vinyl esters, vinyl acetate is the preferred monomer.

The properties of the copolymers may be varied within certain limits for special requirements by introducing polymerized units of other olefinically unsaturated monomers in amounts of 0 to 20% and particularly 0 to 10% by weight of the total monomers during production. The polymerized radicals of these monomers should not contain any grouping which will react with isocyanate groups under the reaction conditions. Other suitable olefinically unsaturated monomers are esters of acrylic and/or methacrylic acid, such as n-butyl acrylate or 2-ethylhexyl acrylate, esters of other olefinically unsaturated carboxylic acids having three to six carbon atoms, such as of chloroacrylic acid, crotonic acid, maleic acid, fumaric acid or itaconic acid, vinyl halides such as vinyl chloride or vinylidene chloride, vinylidene cyanide, and copolymerizable ethylenically unsaturated nitriles, such as acrylonitrile and methacrylonitrile. The use of other acrylic acid esters and/or methacrylic acid esters is very advantageous and the use of acrylonitrile and/or methacrylonitrile in the production of the copolymers is of particular advantage.

The copolymers containing hydroxyl groups used according to this invention should be prepared by polymerization of the monomers in organic solvents in the presence of organic sulfides which do not contain mercapto groups.

Conventional methods of copolymerization and conventional polymerization catalysts may be used, for example organic peroxides, redox catalysts or (with particular advantage) azo compounds, particularly azodiisobutyronitrile and azodiisobutyrodiamide.

Suitable solvents for the polymerization are the organic solvents conventionally used in the surface coatings industry which are inert to isocyanates, i.e., do not contain any groupings, particularly any active hydrogen atoms, which will react with isocyanates under the reaction conditions. Examples of suitable solvents are aliphatic esters such as ethyl glycol acetate, methyl glycol acetate or ethyl acetate, and aromatic hydrocarbons such as xylene or toluene. For some uses it may be advantageous to use mixtures of solvents.

Particularly suitable organic sulfides which do not contain mercapto groups and which act as regulators in the copolymerization are compounds of the type of dialkylxanthic disulfides, especially those having one to eight and particularly one to four carbon atoms. Diisopropylxanthic disulfide has proved to be especially suitable. It is advantageous to add 2 to 6% by weight (with reference to the monomers) of these compounds to the polymerization mixture. The amount depends on the desired viscosity of the copolymer to be used in the coating composition. In special cases therefore the amount used may be somewhat above or below the said limits. The amount of regulator also depends on the monomers used because a higher content of for example styrene causes a higher viscosity of the copolymer while a higher content of for example tert-butyl acrylate results in lower viscosity of the copolymer. Regulators which contain free SH-groups (although often used in polymerizations) are not suitable in the present case.

Polyisocyanates not containing aromatic radicals include compounds having at least two isocyanate groups which are separated by an aliphatic or cycloaliphatic chain which may contain heteroatoms. Examples are aliphatic hydrocarbons bearing two isocyanate groups as substituents, such as propane diisocyanate-1,2, butane diisocyanate-1,2, pentane diisocyanate-1,2, pentane diisocyanate-1,3, hexane diisocyanate-1,2, hexane diisocyanate-1,3, hexane diisocyanate-1,4, hexane diisocyanate-1,5, hexane diisocyanate-1,6, 4-methylhexane diisocyanate-1,2 or 4-methylhexane diisocyanate-1,3. In general simple aliphatic polyisocyanates are however only used if their molecular weight is high enough to preclude damage during processing by too high a vapor presence of the polyisocyanate. This is true for example in the case of dicyclohexylmethane diisocyanate and similar high molecular weight cycloaliphatic polyisocyanates. It is preferred to use reaction products of these polyisocyanates with low molecular weight compounds having a plurality of active hydrogen atoms, particularly polyalcohols, which contain at least two free isocyanate groups, for example reaction products of 1,1,1-trimethylolpropane and 3 moles of hexamethylene-1,6-diisocyanate, and analogous reaction products of polyhydric alcohols and excess amounts of diisocyanates. N,N',N''-tris-(isocyanatohexyl)-biuret is a particularly preferred isocyanate component.

In special cases it is possible to use, instead of the free polyisocyanates, compounds known as blocked polyisocyanates, such as phenylurethanes or reaction products of isocyanates with CH-acid compounds which act like isocyanates at elevated temperature.

Reaction of the polyisocyanates with the said copolymers containing hydroxyl groups may be carried out in conventional manner, the polyisocyanate usually being used in about an equivalent amount to the hydroxyl groups in the copolymer. The polyisocyanate may be added to the solution of the copolymer either direct if it is liquid or in the form of a solution thereof in an inert organic solvent. To achieve certain effects other components, for example heat-curable urea-formaldehyde or melamine-formaldehyde resins, phenol resins, epoxy resins or vinyl polymers, in minor amounts.

Coatings prepared from the mixtures of copolymers and polyisocyanates may be cured at room temperature. It is often advantageous to use higher temperatures, particularly from 100° to 160° C., especially when using blocked isocyanates. The curing time can be considerably shortened when a high temperature is used. Curing can be accelerated by adding conventional catalysts for reactions of isocyanato groups, for example tertiary amines such as triethylene diamine, bismuth salts, lead salts or tin compounds.

Coating materials prepared according to this invention by reaction of certain polyisocyanates with special copolymers prepared in a specific way are distinguished by a combination of advantageous properties. Cured coatings are very resistant to hydrolysis and have outstanding light fastness. In light fastness they are superior to coatings of prior art paint systems based on polyisocyanates and polyethers, polyesters or polymers containing hydroxyl groups. Coating materials according to this invention have the advantage over prior art light-fast reaction products of polyesters containing hydroxyl groups with polyisocyanates that they require considerably smaller amounts of expensive and more difficulty obtainable polyisocyanate components.

Another advantage of the paint systems according to the invention is that they can be applied to a great variety of substrates. They may be used for example for coating metals, such as iron, steels of widely varying composition, aluminium or alloys, and also for the production of coatings on wood, glass or ceramic materials. In all these uses the coatings, even in highly pigmented condition, exhibit a surprisingly high gloss. With this property they combine good flexibility which is particularly important when, after the coating has been applied to metal, the metal is shaped. Coating materials according to this invention are therefore suitable for the method known as coil coating.

The invention is illustrated by the following examples in which parts and percentages specified are by weight. The K values given are determined by measurements of 2% by weight copolymer solutions in dimethylformamide by the method of H. Fikentscher, Cellulosechemie, 13, 58 (1932). The hydroxyl numbers (OH numbers) are calculated for the solvent-free resin (solid resin).

EXAMPLE 1

25 parts of 1,4-butanediol monoacrylate, 30 parts of methyl methacrylate, 25 parts of tert-butyl acrylate, 20 parts of styrene, 1 part of azodiisobutyronitrile and 4 parts of diisopropylxanthic disulfide in 54 parts of ethyl glycol acetate are heated while stirring in a polymerization vessel in an atmosphere free from oxygen at 95° to 100° C. After the polymerization has begun, a mixture of 50 parts of 1,4-butanediol monoacrylate, 60 parts of methyl methacrylate, 50 parts of tert-butyl acrylate, 40 parts of styrene, 2 parts of azodiisobutyronitrile and 8 parts of diisopropylxanthic disulfide in 108 parts of ethyl glycol acetate is gradually added in the course of thirty minutes to the polymerization mixture which is kept at 90° to 100° C. One hour, three hours and five hours after completion of the addition, 3 parts of azodiisobutyronitrile is added. After a total reaction period of eight hours, the solids content of the solution is 64.0%. The copolymer has a K value of 15.8 and an OH number of 97.5.

100 parts of the 64% copolymer solution is ground with 50% of rutile after 70 parts of a mixture of ethyl glycol acetate and toluene (ratio by volume 1:1) has been added, and mixed with 29 parts of a 75% solution of N,N'N''-tris-(isocyanatohexyl)-biuret in a mixture of equal parts of ethyl glycol acetate and xylene. The composition obtained is sprayed onto rust free sheet iron. A high gloss coating with good flow is obtained which is tackfree after about 2½ hours and after eight days has a pendulum hardness according to Konig (DIN 53,157) of 165 seconds and a Erichsen value (DIN 53,156) of 9.1. Coatings obtained by baking at 150° C. for one hour have a pendulum hardness according to Konig of 168 seconds and an Erichsen value of 8.4.

EXAMPLE 2

A mixture of 60 parts of 1,4-butanediol monoacrylate, 165 parts of tert-butyl acrylate, 60 parts of styrene, 15 parts of vinyl acetate, 12 parts of diisopropylxanthic disulfide, 3 parts of azodiisobutyronitrile and 162 parts of ethyl glycol acetate is prepared, one third of the mixture is heated to 90° to 100° C. in a polymerization vessel while stirring under nitrogen and the remainder of the mixture is slowly introduced after the polymerization has begun. 3 parts of azodiisobutyronitrile is added at the end of one hour, three hours and five hours after all has been added, the temperature of the polymerization mixture being held at 90° to 100° C. After a total of eight hours, a 64% solution of a copolymer is obtained having a K value of 13.7 and an OH number of 78.

50 parts of the copolymer solution is ground with 50% of rutile (with reference to the total binder content) after 35 parts of a mixture of equal parts by volume of ethyl glycol acetate and xylene has been added and then mixed with 11.6 parts of the 75% polyisocyanate specified in Example 1. The resultant composition is sprayed onto sheet iron. A high gloss coating is obtained which is tackfree after 3.5 hours. The pendulum hardness according to Konig is 119 seconds after seven days, the Erichsen value is 9.0. An identical coating which has been baked for one hour at 150° C. has a pendulum hardness according to Konig of 168 seconds and an Erichsen value of 8.6.

Comparative experiment to Example 2

A copolymer is prepared as in Example 2 but an equal amount of n-butyl acrylate units is used instead of tert-butyl acrylate. The copolymer solution is mixed and the resultant composition is sprayed onto sheet iron, both as described in Example 2. Matt coatings are obtained which are still very tacky after twenty-four hours at room temperature and have a pendulum hardness according to Konig of only 16 seconds after seven days. An identical coating which has been baked for one hour at 150° C. has a pendulum hardness according to Konig of 17 seconds and is quite unsuitable for practical purposes.

EXAMPLE 3

65 parts of tert-butyl acrylate, 15 parts of styrene, 20 parts of 1,4-butanediol monoacrylate, 1 part of azodiisobutyronitrile and 3 parts of diisopropylxanthic disulfide are heated to 90° to 95° C. in 54 parts of ethyl glycol acetate in an atmosphere free from oxygen while stirring. After polymerization has started, a mixture of 65 parts of tert-butyl acrylate, 15 parts of styrene, 20 parts of 1,4-butanediol monoacrylate, 1 part of azodiisobutyronitrile, 3 parts of diisopropylxanthic disulfide and 54 parts of ethyl glycol acetate is allowed to flow in. When all has been added, another 2 parts of azodiisobutyronitrile is added and the temperature is kept at 90° to 95° C. for another twelve hours. A 64.5% solution of a copolymer is obtained which has a K value of 16.1 and an OH number of 78.

100 parts of the copolymer solution is mixed with 23 parts of the 75% solution of polyisocyanate specified in Example 1 and diluted with 40 parts of ethyl glycol acetate. The mixture is brushed onto a rust-free sheet as a transparent coating. Moreover 50 parts of the copolymer solution is ground with 50% of rutile (with reference to the total binder content) after 35 parts of a mixture of equal volumes of ethyl glycol acetate and xylene has been added and then mixed with 11.5 parts of a 75% solution of the polyisocyanate described in Example 1. The composition obtained is sprayed onto sheet iron. The properties of the coating obtained are given in the table.

Comparative experiment to Example 3

65 parts of isobutyl acrylate, 15 parts of styrene, 20 parts of 1,4-butanediol monoacrylate, 1 part of azidiisobutyronitrile and 5 parts of hexene-3-diol-2,5 are heated at 90° to 95° C. in an oxygen-free atmosphere while stirring. After polymerization has begun, a mixture of 65 parts of isobutyl acrylate, 15 parts of styrene, 20 parts of 1,4-butanediol monoacrylate, 1 part of azodiisobutyronitrile, 5 parts of hexene-3-diol-2,5 and 54 parts of ethyl glycol acetate is allowed to flow in. After all has been added, another 2 parts of azodiisobutyronitrile is added and the temperature is held at 90° to 95° C. for another twelve hours. A 64.5% solution of a copolymer having a K value of 22.0 and an OH number of 78 is obtained.

In the same way as described in Example 3, a transparent material and a pigmented material are prepared and applied to sheet iron.

The properties of the coatings thus prepared are compared with the properties of the coatings prepared according to Example 3 in the table.

The following abbreviations are used in the table:

3TM=coating from transparent material of Example 3.
3PM=coating from pigmented material of Example 3.
CTM=coating from transparent material of comparative experiment to Example 3.
CPM=coating from pigmented material of comparative experiment to Example 3.

TABLE

|  | 3TM | 3PM | CTM | CPM |
|---|---|---|---|---|
| Tackfree after (hours) | 1.5 | 2.5 | 24 | 24 |
| Pendulum hardness after (sec.)— |  |  |  |  |
| 1 day at room temperature | 123 | 13 | (¹) | (¹) |
| 7 days at room temperature | 187 | 127 | 60 | 37 |
| 1 hour at 150° C | 177 | 151 | 63 | 52 |
| Erichsen value after— |  |  |  |  |
| 7 days at room temperature | 9.7 | 8.8 | 9.7 | 9.1 |
| hour at 150° C | 9.8 | 9.7 | 9.9 | 9.4 |

¹ Tacky.

The table shows that the drying times of the coatings prepared according to comparative experiment to Example 3 are far too long so that the materials are unsuitable for practical purposes. Moreover the pendulum hardness according to Konig, particularly in the case of the pigmented sample, is so low that a scratch resistant coating cannot be prepared.

EXAMPLE 4

About one third of a mixture of 75 parts of 1,4-butanediol monoacrylate, 150 parts of styrene, 30 parts of acrylonitrile, 45 parts of tert-butyl acrylate, 12 parts of diisopropylxanthic disulfide, 3 parts of azodiisobutyronitrile and 162 parts of ethyl glycol acetate is heated at 85° to 90° C. in a polymerization vessel while stirring and excluding oxygen. After polymerization has begun, the remainder of the mixture is added in the course of thirty minutes. The temperature of the polymerization mixture is then kept for eight hours at 90° C., three lots of 3 parts of azodiisobutyronitrile being added after one hour, three hours and five hours. A 64.1% solution of a copolymer having a K value of 16.1 and an OH number of 98 is obtained. When diluted to a solids content of 50%, the coplymer solution has an outflow time from DIN-beaker No. 4 of 111 sceonds.

100 parts of the 64.1% copolymer solution is mixed with 28.8 parts of a 75% solution of the polyisocyanate specified in Example 1, the whole is diluted with 17.5 parts of ethyl glycol acetate and the resulting mixture is brushed onto rust-free sheet iron. Coatings are obtained which are tackfree after two hours. After seven days the coatings have a pendulum hardness according to König (DIN 53,157) of 162 and an Erichsen number (DIN 53,156) of 8.6. After baking for one hour at 150° C., a coating is obtained which has a pendulum hardness of 172 and an Erichsen number of 9.5.

50 parts of 64.1% copolymer solution is ground with 50% of rutile (with reference to the total content of binder) after 46 parts of ethyl glycol acetate has been added and then mixed with 14.4 parts of the 75% solution of the polyisocyanate described in Example 1. The resulting composition is sprayed onto sheet iron. Highly elastic, well adherent coatings are obtained which have a pendulum hardness according to König of 162 and an Erichsen number of 9.2 after seven days at room temperature.

EXAMPLE 5

A 63.7% solution of a copolymer having an OH number of 117 and a K value of 17.4 is prepared from 90 parts of 1,4-butanediol monoacrylate, 105 parts of tert-butyl acrylate, 90 parts of styrene, 15 parts of acrylonitrile, 3 parts of azodiisobutyronitrile, 9 parts of diisopropylxanthic disulfide and 162 parts of ethyl glycol acetate as described in Example 4.

100 parts of the 63.7% copolymer solution is pigmented with 50 parts of rutile after the addition of 85 parts of ethyl glycol acetate and then mixed with 34 parts of the polyisocyanate specified in Example 1. The resulting mixture is sprayed onto sheet iron. A coating is obtained having high gloss and good flow which after eight days at room temperature has a pendulum hardness according to König (DIN 53,157) of 180 seconds and an Erichsen number (DIN 53,156) of 7.0. A coating which has been baked for one hour at 150° C. has a pendulum hardness of 170 seconds and an Erichsen value of 8.4.

EXAMPLE 6

About one third of a mixture of 60 parts of ethylene glycol monoacrylate, 60 parts of styrene, 180 parts of tert-butyl acrylate, 12 parts of diisopropylxanthic disulfide, 3 parts of azodiisobutyronitrile and 162 parts of ethyl glycol acetate is heated at 85° to 90° C. in a polymerization vessel while stirring and excluding oxygen. After the polymerization has begun, the remainder of the mixture is added in the course of thirty minutes. The temperature of the polymerization mixture is then held for another eight hours at 90° C., 3 parts of azodiisobutyronitrile being added in each case after one hour, three hours and five hours. A 63.5% solution of a copolymer having a K value of 15.3 and an OH number of 97 is obtained.

50 parts of the 63.5% copolymer solution is ground with 50% of rutile (with reference to the total content of binder) after 45 parts of ethyl glycol acetate has been added, and then mixed with a mixture of 13 parts of a 75% solution of N,N′,N″-tris-(isocyanatohexyl)-biuret in a mixture of equal volumes of ethyl glycol acetate and xylene and 0.5 part of hexamethylene diisocyanate. The mixture is sprayed onto sheet iron. A high gloss coating is obtained which after seven days has a pendulum hardness according to König (DIN 53,157) of 134 seconds and an Erichsen number (DIN 53,156) of 9.8. A coating which has been baked for one hour at 150° C. has a pendulum hardness of 180 seconds and an Erichsen number of 8.5.

EXAMPLE 7

A 63% solution of a copolymer having an OH number of 78 and a K value of 12.7 is prepared as described in Example 4 from 60 parts of butanediol monoacrylate, 180 parts of tert-butyl acrylate, 60 parts of vinyl acetate, 9 parts of diisopropylxanthic disulfide, 162 parts of ethyl glycol acetate and 3 parts of azodiisobutyronitrile. 100 parts of the copolymer solution is mixed with 23 parts of a 75% solution of the polyisocyanate specified in Example 1, diluted with 40 parts of ethyl glycol acetate and the mixture is brushed onto rust-free sheet iron. Coatings are obtained which are tackfree after three hours. After seven days the coatings have a pendulum hardness according to König (DIN 53,157) of 139 seconds and an Erichsen number (DIN 53,156) of 9.2. After baking for one hour at 150° C., a coating is obtained having a pendulum hardness of 176 and an Erichsen number of 10.

EXAMPLE 8

A 63.8% solution of a copolymer having a K value of 13.5 and an OH number of 79 is prepared as described in Example 4 from 45 parts of 1,4-butanediol monoacrylate, 7.5 parts of ethylene glycol monoacrylate, 7.5 parts of 1,6-hexanediol monoacrylate, 150 parts of tert-butyl acrylate, 60 parts of styrene, 30 parts of vinyl acetate, 12 parts of diisopropylxanthic disulfide, 3 parts of azodiisobutyronitrile and 162 parts of ethyl glycol acetate.

100 parts of the copolymer solution is mixed with 23.5 parts of a 75% solution of the polyisocyanate specified in Example 1, diluted with 40 parts of ethyl glycol acetate and brushed onto rust-free sheet iron. High gloss transparent coatings having good flow are obtained which are tackfree after two hours and after eight days have a pendulum hardness of 175 seconds and an Erichsen number of 9.5. Coatings obtained by baking for one hour at 150° C. have a pendulum hardness of 185 seconds and an Erichsen number of 9.1.

We claim:
1. In a process for the production of coating materials by reaction of a polyisocyanate and an acrylic polymer containing hydroxy groups, the improvement which comprises reacting a polyisocyanate with an interpolymer of:
(1) 15 to 40% by weight of a monoester of acrylic acid and/or methacrylic acid with an aliphatic polyhydric alcohol;
(2) 5 to 70% by weight of an ester of acrylic acid and/or methacrylic acid with an alkanol which forms homopolymers having a glass temperature of from +3° C. to +120° C.;
(3a) 10 to 55% by weight of a vinyl aromatic monomer or isopropenyl aromatic monomer having eight to fourteen carbon atoms, or
(3b) 10 to 20% by weight of a vinyl ester of an alkane monocarboxylic acid having two to five carbon atoms;
(4) 0 to 10% by weight of a vinyl ester of an alkane monocarboxylic acid having two to five carbon atoms; and
(5) 0 to 20% by weight of one or more other olefini- cally unsaturated monomers selected from the group consisting of the esters of olefinically unsaturated monocarboxylic and dicarboxylic acids, vinyl halides, vinylidene halides, acrylonitrile and methacrylonitrile, said interpolymer having been obtained by polymerizing said monomers in an organic solvent which is inert to isocyanates in the presence, as a regulator, of a dialkylxanthic disulfide.

2. A process as claimed in claim 1 wherein the amount of component (1) is 20 to 30% by weight with reference to all the monomeric components.

3. A process as claimed in claim 1 wherein the amount of component (2) is 35 to 65% by weight with reference to all the monomeric components.

4. A process as claimed in claim 1 wherein the amount of component (3a) is 15 to 30% by weight with reference to all the monomeric components.

5. A process as claimed in claim 1 wherein said interpolymer is prepared with 10–30% by weight of said vinyl ester of an alkane carboxylic acid having two to five carbon atoms.

6. A process as claimed in claim 1 wherein the regulator used is diisopropylxanthic disulfide.

7. A process as claimed in claim 1 wherein the amount of regulator used is 2 to 6% by weight with reference to the monomers.

8. A process as claimed in claim 1 wherein curing is carried out at from 100° to 160° C.

References Cited

UNITED STATES PATENTS

| 2,681,897 | 6/1954 | Frazier et al. | 260—45.2 |
| 3,025,268 | 3/1962 | Deex et al. | 260—77.5 |
| 3,257,360 | 6/1966 | Slocombe | 260—78.5 |

JOSEPH L. SCHOFER, Primary Examiner

S. M. LEVIN, Assistant Examiner

U.S. Cl. X.R.

260—31.6, 33.6, 41, 78.5, 80.75; 117—123, 124, 132, 148